Aug. 30, 1949.  W. S. REED  2,480,770
AUTO TOW

Filed Feb. 1, 1946  2 Sheets-Sheet 1

INVENTOR.
Wilbur S. Reed
BY
HIS ATTORNEY

Aug. 30, 1949.　　　W. S. REED　　　2,480,770
AUTO TOW

Filed Feb. 1, 1946　　　　　　　　　　2 Sheets-Sheet 2

INVENTOR.
Wilbur S. Reed
BY
HIS ATTORNEY

Patented Aug. 30, 1949

2,480,770

UNITED STATES PATENT OFFICE 2,480,770

AUTO TOW

Wilbur S. Reed, Philadelphia, Pa., assignor to J & R Products Company, Philadelphia, Pa., a co-partnership Application February 1, 1946, Serial No. 644,771

4 Claims. (Cl. 280—33.14)

This invention relates to devices for towing one automobile by another, and in particular a portable device that may be carried in one car and readily applied by attaching the ends to the bumpers, one to the rear and the other to the front, so that one car may be towed by another without an operator in the car being towed. In towing one car by another without an operator in the car being towed, it is necessary to hold the car being towed at the center so that it will follow in a direct line and around corners with the point from which it is pulled located between the two cars, and to accomplish this the device of this invention is formed in two sections and the sections are hinged together to provide lateral bending at a point between the cars.

Devices for towing one automobile by another are also confronted with the problem of adjustment, in that bumpers are of different widths and the attaching jaws or parts must, therefore, grip in different positions. With the jaws adjustable to grip bumpers of different widths, it is necessary to equalize the strains so that the pull is the same on each jaw and is in the same direction at all times. This invention, therefore, contemplates jaws pivotally mounted at the ends of a connecting bar whereby the line of force is through the connecting point and equalized in the jaws.

In providing gripping jaws adapted for adjustment to grip objects of different widths about a central point, it is necessary to hold the jaws with a common connection and, as unusual strains are encountered in towing automobiles, the connection holding the jaws of this invention is provided with compensating washers having curved faces and correspondingly curved seating surfaces upon which the washers may ride whereby the strains are equalized in all positions.

In towing one automobile by another with a rigid connection between the bumpers, it is also necessary to provide swivel connections at the ends, whereby the bumper of one car may move vertically in relation to the bumper of the other and, therefore, the connector of this invention, which uses jaws pivotally attached to the ends thereof, provides freedom of movement vertically between the jaws and the connecting bar.

Towing devices of this type are normally carried in one car to a stationary car and, when the cars are in position, the operator must carry the device to a point between the cars and, holding it in position, readily attach the ends. For this reason it is necessary that the device is of comparatively light weight, so that one man may readily carry and hold the device while the ends are being attached.

Towing devices of this type must also be held in one hand while the attaching parts are adjusted and clamped by the other hand, therefore, the device of this invention provides gripping jaws readily adjusted by a common wing nut that may be turned by one hand.

In attaching an auto tow of this type, it is sometimes impossible to place the towing car directly in front of the car to be towed and, therefore, this invention contemplates a device having connectors at each end and a joint between the connectors in which the connectors may readily be separated at the joint and a cable or the like attached to the respective ends of the device with the ends attached to the bumpers or other parts of the cars.

Automobile bumpers are not only of different widths but are also of various shapes, such as flat, round, rectangular or square, and, therefore, the jaws of the device of this invention are shaped to provide gripping action on bumpers or parts of substantially any shape in cross section.

The purpose of this invention is, therefore, to provide a unique towing device whereby one motor vehicle may be towed by another, that may be carried in one vehicle and readily applied by one person, which provides vertical swivel action at the ends and a lateral hinge action between the ends.

It is also essential in towing devices of this type that the entire unit be self-contained, whereby it is not necessary to carry wrenches or other tools to attach or remove the device. The coupling pin of the device of this invention, which may be removed to separate the ends, is, therefore, provided with a key ring, which may readily be removed when it is desired to use the ends independently or in combination with a towing cable or other flexible connection.

The object of the invention is to provide a connecting bar with a separable hinge connection between the ends and gripping jaws pivotally attached to the ends in which the jaws are symmetrical about the pivots and in which the jaws are held in gripping relation by common members extending therethrough adapted to contact and hold the jaws in different positions.

Another object is to provide gripping jaws for a towing device for motor vehicles in which the cross section areas of the jaws are increased for reinforcement at the gripping ends to prevent breakage where the load is applied.

A further object is to provide means for attaching gripping jaws to the ends of a bar to provide swivel action between the jaws and bar and in which the positions of the jaws are symmetrical above and below the pivot point wherein the strains through the jaws are equalized.

With these and other objects in view, the invention embodies a connecting bar having a tongue and groove connection intermediate of the ends with a readily removable coupling pin therethrough, rivets extending through the ends of the bars, the axes of which are perpendicular to the axis of the coupling pin, gripping jaws pivotally mounted on the rivets and locking bolts extending through the jaws for holding the jaws in gripping relation.

For a full and more complete understanding of the invention, reference may be had to the following description and accompanying drawings, wherein.

Figure 1:
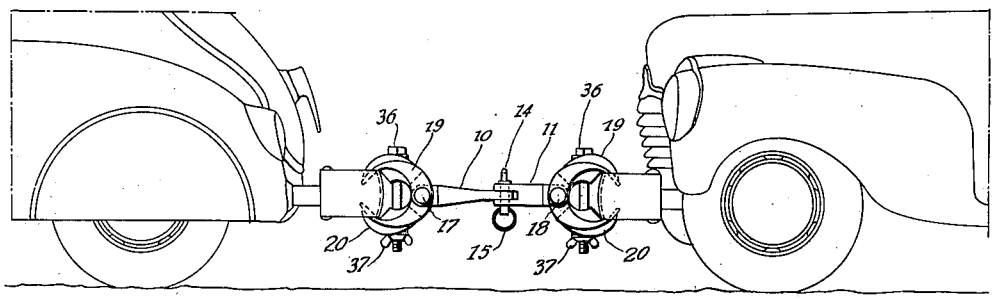
Figure 1 illustrates the device with one end attached to the rear bumper of a towing vehicle and the other attached to the bumper at the front of a vehicle being towed.

Referring now to the drawings wherein like reference characters denote corresponding parts, the towing bar is formed with two sections 10 and 11 hingedly connected at a point between the ends with a tongue 12 of the section 10 extending into a socket 13 at the end of the section 11 and pivotally held by a coupling pin 14. A key ring 15 is inserted in an opening 16 at one end of the pin to provide holding means and at the same time means whereby the pin may readily be removed.

At the outer ends of the sections 10 and 11 are horizontal rivets 17 and 18 and the gripping jaws, which are indicated by the numerals 19 and 20, and which are similar at both ends, are pivotally mounted on the rivets. The upper jaw 19 is formed with extensions 21 and 22 through which it is pivotally mounted on the rivets and the jaw 20 is provided with extensions 23 and 24 positioned within the extensions 21 and 22 of the jaw 19, and these provide mounting means of the jaw 20.

The upper jaws 19 are formed with cross ribs 25 at the back and connecting sections 26 at the front, and the side portions are formed with reinforcing ribs 27 and 28, which are comparatively narrow at the back and taper toward the front where they have sufficient width to reinforce the gripping ends of the jaws. Corresponding ribs and sections are formed on the jaw 20, the connecting section at the back being indicated by the numeral 29 and the section at the front by the numeral 30.

Figure 2:
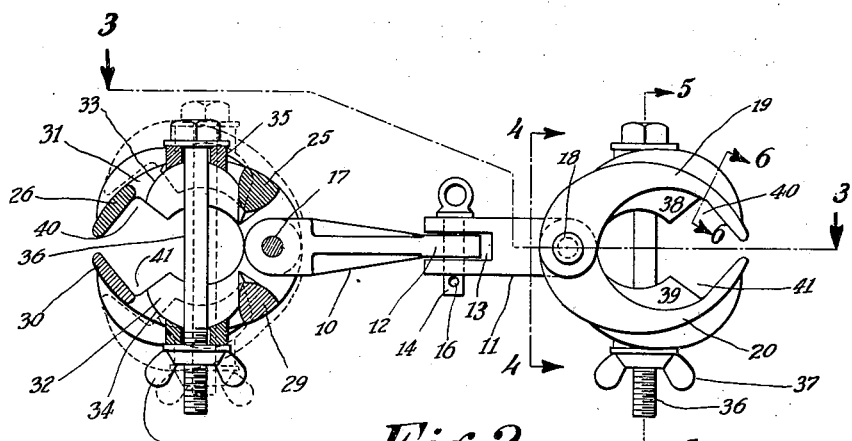
Figure 2 shows a side view of the device with one end shown in elevation and the other in section.
Figure 3:
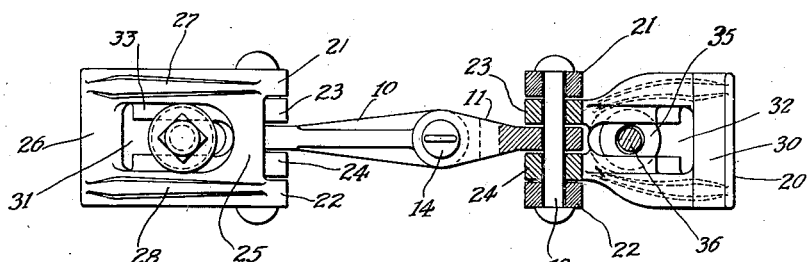
Figure 3 is a plan view of the device with one end shown in elevation and the other in section, and in which the section is taken on line 3—3 of Figure 2.
Figure 4:
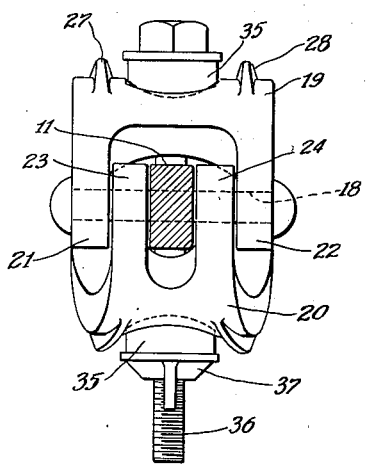
Figure 4 is a cross section through the device on line 4—4 of Figure 2.
Figure 5:
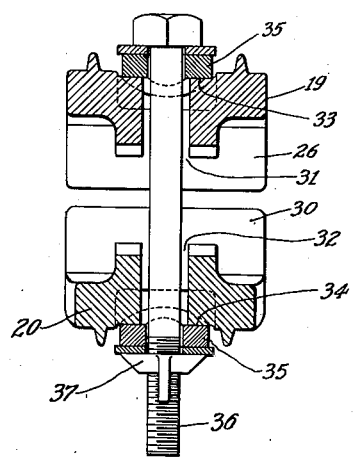
Figure 5 is a cross section through the jaws at the end of the device and is taken on line 5—5 of Figure 2.
Figure 6:
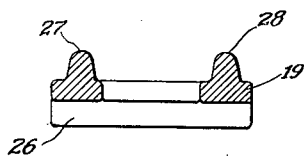
Figure 6 is a section through the gripping portion of one of the jaws taken on line 6—6 of Figure 2.
Figure 7:
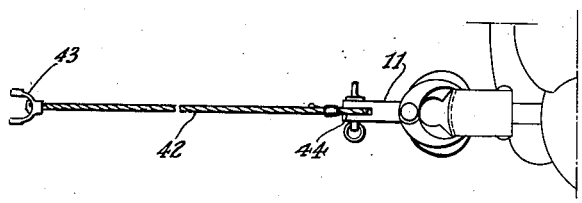
Figure 7 illustrates the device separated with one end attached to a motor vehicle bumper and with the end of a connecting cable held thereto by the coupling pin.

The jaws are formed with open slots 31 and 32 and at the edges of the slots are curved surfaces 33 and 34, against which washers 35, having corresponding curved surfaces, ride. It will be noted in Figure 2 that as the jaws are opened from the position illustrated in full lines to that shown in dotted lines the washers 35 will ride on the curved surfaces of the jaws and the connecting bolts 36 will move backward, whereby the bolts will remain in a position perpendicular to the plane of the connecting bar at all times and the movement of the jaws toward and away from the center will be equalized. The bolts 36 are provided with wing nuts 37, which may be screwed on or off the bolts to release the jaws or hold the jaws in gripping relation on the bumpers. The inner surfaces of the jaws are formed with projections 38 and 39, providing V-shaped recesses 40 and 41 for receiving the upper and lower edges of bumpers or the like. The device may also be provided with a towing cable 42, having a clevis 43 at one end and an eye 44 at the other, so that the two ends of the device may be separated and flexibly attached by a cable for towing at a distance when it is impossible to back the bumper of the towing car to a convenient distance in front of the bumper of the car to be towed. The coupling pin is removed, the eye 44 inserted in the socket 13, and the clevis 43 is attached to the tongue 12. It will be understood, however, that any suitable device may be used for flexibly holding the ends of the device together.

The construction of the device will be readily understood from the foregoing description. In use the towing device may be provided as shown and described and, when it is desired to bring a car to or from a garage, or tow a car for any purpose, one car may be positioned in front of a car to be towed with the bumpers substantially in the position illustrated in Figure 1 and, holding the device with one hand, the attendant may apply the jaws to the bumpers by first opening the jaws and then tightening the nuts 37, so that the jaws are clamped to the upper and lower edges of the bumpers. With the device attached in this manner, wherein the jaws open symmetrically about the center, the strains are equalized and the bumpers may travel upward and downward in relation to each other with the bar remaining straight. The swivel action of the jaws around the rivets or pins at the ends of the bar provides vertical flexibility of movement. The device is also free to bend laterally at the center, whereby the car being towed will follow in a direct line or around curves or corners or the like.

While a preferred specific embodiment of the invention is hereinbefore set forth, it is to be clearly understood that the invention is not to be limited to the exact construction illustrated and described because various modifications of these details may be provided in putting the invention into practice within the purview of the appended claims.

What is claimed is:

1. A towing device comprising a bar formed in sections, a coupling pin hingedly connecting the sections of the bar together at a point intermediate of the ends, gripping jaws at the ends of the sections of the bar, pins attaching the jaws to the bar providing swivel connections, clamping means including bolts for holding the jaws in gripping relation with the jaws symmetrical about a plane extending through the said swivel point, and means connected to the gripping jaws and the clamping means, whereby the clamping means remain continuously perpendicular to said plane while said jaws are angled about the swivel point.

2. A towing device comprising a bar formed in sections, a coupling pin hingedly connecting the sections of the bar together at a point intermediate of the ends, gripping jaws at the ends of the sections of the bar, pins attaching the jaws to the bar providing swivel connections, bolts extending through the jaws, washers with curved surfaces associated with the bolts and jaws riding against correspondingly curved surfaces of the jaws, and means on the bolts holding the jaws through the washers in gripping relation.

3. A towing device comprising a bar formed in sections, a coupling pin hingedly connecting the sections of the bar together at a point intermediate of the ends, gripping jaws at the ends of the sections of the bar, pins attaching the jaws to the bar providing swivel connections, bolts extending through the jaws, washers with curved surfaces associated with the bolts and jaws riding against correspondingly curved surfaces of the jaws, and means on the bolts holding the jaws through the washers in gripping relation, said device characterized in that the curved surfaces of the washers compensate for movements of the jaws whereby the jaws are symmetrical about the center in different gripping positions and the bolt is perpendicular to a plane passing through the said center.

4. A towing device comprising a bar formed of hinged sections, symmetrical gripping jaws pivotally mounted at the ends of the bar, means including bolts for holding the jaws in gripping relation, and means connected to the gripping jaws and the holding means, whereby the jaws are symmetrical about their axis of rotation and in different gripping positions while the holding means are retained continuously in a position perpendicular to a fixed plane passing through said axis of rotation, said device being characterized in that the said hinged sections of the bar are readily separable.

WILBUR S. REED.

REFERENCES CITED

The following references are of record in the file of this patent:

UNITED STATES PATENTS

| Number | Name | Date |
|---|---|---|
| 1,535,397 | Buffington | Apr. 28, 1925 |
| 2,243,347 | Klein et al. | May 27, 1941 |
| 2,268,181 | Bolton | Dec. 30, 1941 |